(12) United States Patent
Kimura

(10) Patent No.: US 7,583,415 B2
(45) Date of Patent: Sep. 1, 2009

(54) IMAGE PROCESSING APPARATUS

(75) Inventor: Tatsuo Kimura, Kanagawa (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 597 days.

(21) Appl. No.: 10/937,359

(22) Filed: Sep. 10, 2004

(65) Prior Publication Data
US 2005/0068552 A1 Mar. 31, 2005

(30) Foreign Application Priority Data
Sep. 30, 2003 (JP) .............................. 2003-339997

(51) Int. Cl.
H04N 1/40 (2006.01)
(52) U.S. Cl. ...................................... 358/461; 358/448
(58) Field of Classification Search ................. 358/445, 358/461, 426.14, 448; 382/237
See application file for complete search history.

(56) References Cited
U.S. PATENT DOCUMENTS
4,809,082 A * 2/1989 Yamaguchi et al. ........ 358/3.19
5,237,431 A * 8/1993 Imoto ........................ 358/445
6,965,402 B2 * 11/2005 Schmitz et al. .......... 348/230.1

FOREIGN PATENT DOCUMENTS
JP       A 5227437      9/1993

* cited by examiner

Primary Examiner—Douglas Q Tran
(74) Attorney, Agent, or Firm—Fitzpatrick, Cella, Harper & Scinto

(57) ABSTRACT

An image processing apparatus for obtaining image information by detecting, as an image signal, an electrical signal corresponding to a reflectance or transmittance of an original, including: an A/D converting circuit for converting an analog signal outputted from a photoelectric conversion element into an n-bit digital signal; and a shading correcting circuit for correcting an output characteristic of the photoelectric conversion element, high m bits of the n-bit digital signal being set as effective bits when white shading data is obtained, low m bits of the n-bit digital signal being set as effective bits when black shading data is obtained, bits being added as low bits to the m-bit white shading data, bits being added as high bits to the black shading data, shading calculation being performed. In the image processing apparatus, a capacity of a shading memory can be suppressed without reduction in quantifying resolution of the black shading data.

2 Claims, 6 Drawing Sheets

IMAGE PROCESSING APPARATUS

BACKGROUND OF THE INVENTION

1. Field of the Invention

The present invention relates to an image processing apparatus capable of outputting high gradation and high quality image output information while reducing a substantial quantifying bit number of the image output information.

2. Related Background Art

A photoelectric conversion element which has a one-line structure and is composed of minute cells which can read at a resolution of several lines/mm to several tens of lines/mm, such as a CCD sensor or a contact sensor is used for an image reading apparatus which receives an original and reads an image of the original, such as a copying machine or a scanner.

In general, reading is performed in the main scanning direction by electrical scanning of the sensor itself and reading is performed in the sub scanning direction by moving the entire photoelectric conversion element relative to the original.

When high grade reading is performed by the above-mentioned image reading apparatus, it is necessary to obtain faithful information on the original having high gradation. In this case, it is important to recognize the gradation according to a visual characteristic of the naked eye. That is, it is necessary to read a difference of the gradation in a range of a reflectance or a transmittance, which is easy to visually recognize the difference of the gradation.

It has been known that the visually recognized gradation is not in a linear relationship with the amount of reflection light (the amount of transmission light) on the original but substantially proportional to the amount D ($D = -\log_{10} r$, r: reflectance or transmittance) which is called "a density". In other words, when the amount of light becomes smaller (that is, when the gradation is closer to black), a slight difference in the reflectance or the transmittance can be visually recognized.

However, an output characteristic of the sensor is generally proportional to the amount of input light. Therefore, it is required that gradation information on the black side has higher precision than the gradation information on the white side.

In the case of image information converted into a digital signal by A/D conversion, for example, when the image information is eight bits, the gradation information on the black side is roughly quantified, so that the gradation information does not substantially reach the eight bits. Thus, the high precision is required.

The following apparatus has been known as an apparatus for improving a quantifying resolution on the black side in the output characteristic of the sensor (for example, Japanese Patent Application Laid-Open No. H05-227437). In the apparatus, a first A/D conversion circuit is provided for converting the output of a photoelectric conversion element into a digital signal. An amplification circuit is provided for amplifying the output of the photoelectric conversion element by an amplification factor of 2n at the polarity in which an output becomes zero at the time when the amount of input light is zero. A second A/D conversion circuit is provided for converting the output of the amplification circuit into a digital signal. A selecting and bit add-in circuit is provided for adding predetermined bits to a high order or low order of each of the outputs of the first and second A/D conversion circuits and selecting an added output.

According to the apparatus, the quantifying resolution on the most black side of the original can be improved. Thus, the high gradation image reading according to the visual characteristic can be performed.

FIG. 6 is a block diagram showing a conventional image processing apparatus 600.

A CCD sensor 601 serving as the photoelectric conversion element is connected with a sample hold circuit 602. The sample hold circuit 602 is connected with a sample hold circuit 603 and a peak hold circuit 604. Each of the sample hold circuits 602 and 603 and the peak hold circuit 604 are connected with a first A/D conversion circuit 605 and an amplification circuit 606 in a subsequent stage.

The amplification circuit 606 is connected with a second A/D conversion circuit 608 through a limit circuit 607 in a subsequent stage. The first A/D conversion circuit 605 and the second A/D conversion circuit 608 are connected with a selecting and bit add-in circuit 609 in a subsequent stage.

The selecting and bit add-in circuit 609 is connected with a shading correcting circuit 611 through a dark output correcting circuit 610 in a subsequent stage. The dark output correcting circuit 610 includes a correction memory 612 and the shading correcting circuit 611 includes a correction memory 613. The shading correcting circuit 611 is connected with an output terminal 614 in a subsequent stage. The first A/D conversion circuit 605 converts the output of the CCD sensor 601 into a digital signal. The amplification circuit 606 amplifies the output of the CCD sensor 601 by an amplification factor of 2n at the polarity in which an output becomes zero at the time when the amount of input light is zero.

The second A/D conversion circuit 608 converts the output of the amplification circuit 606 into a digital signal. The selecting and bit add-in circuit 609 adds predetermined bits to a high order or low order of each of the outputs of the first and second A/D conversion circuits 605 and 608 and then selects an added output.

Next, the operation of the conventional image processing apparatus 600 will be described.

First, general A/D conversion is performed on an analog signal outputted from the CCD sensor 601 over all ranges by the first A/D conversion circuit 605.

Simultaneously, the output signal of the sample hold circuit 602 is led to the amplification circuit 606 and amplified by an amplification factor of n-power of two (for example, an amplification factor of 16) based on a DS (E) value. The output of the amplification circuit 606 is led to the limit circuit 607 and limited by a smaller suitable value than VrefB. The output signal from the limit circuit 607 is inputted to the second A/D conversion circuit 608.

References VrefT and VrefB of the second A/D conversion circuit 608 are identical to the references of the first A/D conversion circuit 605. Therefore, of all ranges of the output of the CCD sensor 601, in a 1/16 range which is closest to the black side, the quantifying resolution of 16 times can be obtained. That is, it is possible to obtain an A/D conversion output in which the number of bits is larger than that of the output signal from the first A/D conversion circuit 605 by four bits on a low order side.

FIG. 7 shows a state of conversion processing in the conventional image processing apparatus 600.

Here, "a main A/D conversion circuit" corresponds to the first A/D conversion circuit 605 shown in FIG. 6 and "a sub A/D conversion circuit" corresponds to the second A/D conversion circuit 608 shown in FIG. 6. Each A/D conversion circuit is an eight-bit A/D conversion circuit.

An upper side region shown in FIG. 7 indicates an output code at input on the white side. As compared with 16 different output codes from a smaller one in the output signal of the main A/D conversion circuit, an output code of the sub A/D conversion circuit further has a resolution of 16 times.

Therefore, in order that the output signal of the A/D conversion circuit have 12 bits in total, when the output signal of the sub A/D conversion circuit has all "1's", low four bits are further added to the output signal of the main A/D conversion circuit and predetermined values (for example, all "0's") are provided for the low four bits to obtain 12 bits. When the output signal of the sub A/D conversion circuit has information other than all "1's", high four bits, each of which is "0", are further added to the output signal of the sub A/D conversion circuit to obtain 12 bits.

Thus, a characteristic that the quantifying resolution on the black side of the original is higher than a general quantifying resolution is obtained. Note that the operation in which the number of bits of the output signal is increased to 12 bits in total is executed by the selecting and bit add-in circuit 609.

After the resultant signal is outputted from the selecting and bit add-in circuit 609, a dark output changed for each pixel of the CCD sensor 601 is corrected by the dark output correcting circuit 610. In other words, a content stored in advance in the correction memory 612 is read for each of the pixels and computed to correct the dark output changed for each pixel of the CCD sensor 601.

After that, the shading correcting circuit 611 reads correction data stored in advance in the correction memory 613 for each of the pixels and computes to correct a variation in sensitivity for each of the pixels of the CCD sensor 601, an intensity distribution of an illumination system, and the like. An image reading output can be taken from the output terminal 614.

According to the above-mentioned series of processings, the quantifying resolution on the most black side of the original can be increased by 16 times. Therefore, it is possible to perform the high gradation image reading according to the visual characteristic of the naked eye.

In the above-mentioned conventional example, in order to increases the quantifying resolution on the black side in the output characteristic of the sensor, it is necessary to provide the first A/D conversion circuit for converting the output of the photoelectric conversion element into the digital signal, the amplification circuit for amplifying the output of the photoelectric conversion element by the amplification factor of 2n at the polarity in which the output signal becomes zero at the time when the amount of input light is zero, the second A/D conversion circuit for converting the output signal of the amplification circuit into the digital signal, and the selecting and bit add-in circuit.

In addition, in the conventional example, the correction memories are provided in the subsequent stage of the selecting and bit add-in circuit. Therefore, it is required that the correction memories have a bit width corresponding to the quantifying resolution.

The conventional example has a problem in that a circuit scale and a memory capacity are increased in order to realize the high gradation image reading according to the visual characteristic of the naked eye by improving the precision of the quantifying resolution on the black side. Thus, the conventional example tends to increase a cost of the apparatus.

SUMMARY OF THE INVENTION

An object of the present invention is to provide an image processing apparatus for obtaining image information, in which a capacity of a shading memory can be suppressed without reduction in quantifying resolution of black shading data by detecting an electrical signal corresponding to a reflectance or transmittance of an original as an image signal.

According to an aspect of the present invention, there is provided an image processing apparatus for obtaining image information by outputting, as an image signal, an electrical signal corresponding to a reflectance or transmittance of an original from a photoelectric conversion element, including:

an A/D converting circuit for converting an analog signal outputted from the photoelectric conversion element into an n-bit digital signal; and a shading correcting circuit for correcting an output characteristic of the photoelectric conversion element, high m bits of the n-bit digital signal being set as effective bits when white shading data is obtained, low m bits of the n-bit digital signal being set as effective bits when black shading data is obtained, bits being added as low bits to the m-bit white shading data, bits being added as high bits to the black shading data, shading calculation being performed.

According to the structure, when the white shading data is obtained, the high m-bits of the digital signal having a width of the n-bits, which is outputted from the A/D conversion circuit of the n-bits, is stored as effective data in a memory. In addition, when the black shading data is obtained, the low m-bits of the digital signal having the width of the n-bits is stored as effective data in the memory in order to improve precision of a quantifying resolution on a black side. Thus, the capacity of the shading memory can be suppressed without reduction in quantifying resolution of the black shading data.

These and other objects, features and advantages of the present invention will become more apparent upon consideration of the following description of the preferred embodiments of the present invention taken in conjunction with the accompanying drawings.

DETAILED DESCRIPTION OF THE PREFERRED EMBODIMENTS

A best mode for carrying out the present invention is the following embodiment.

Figure 1:
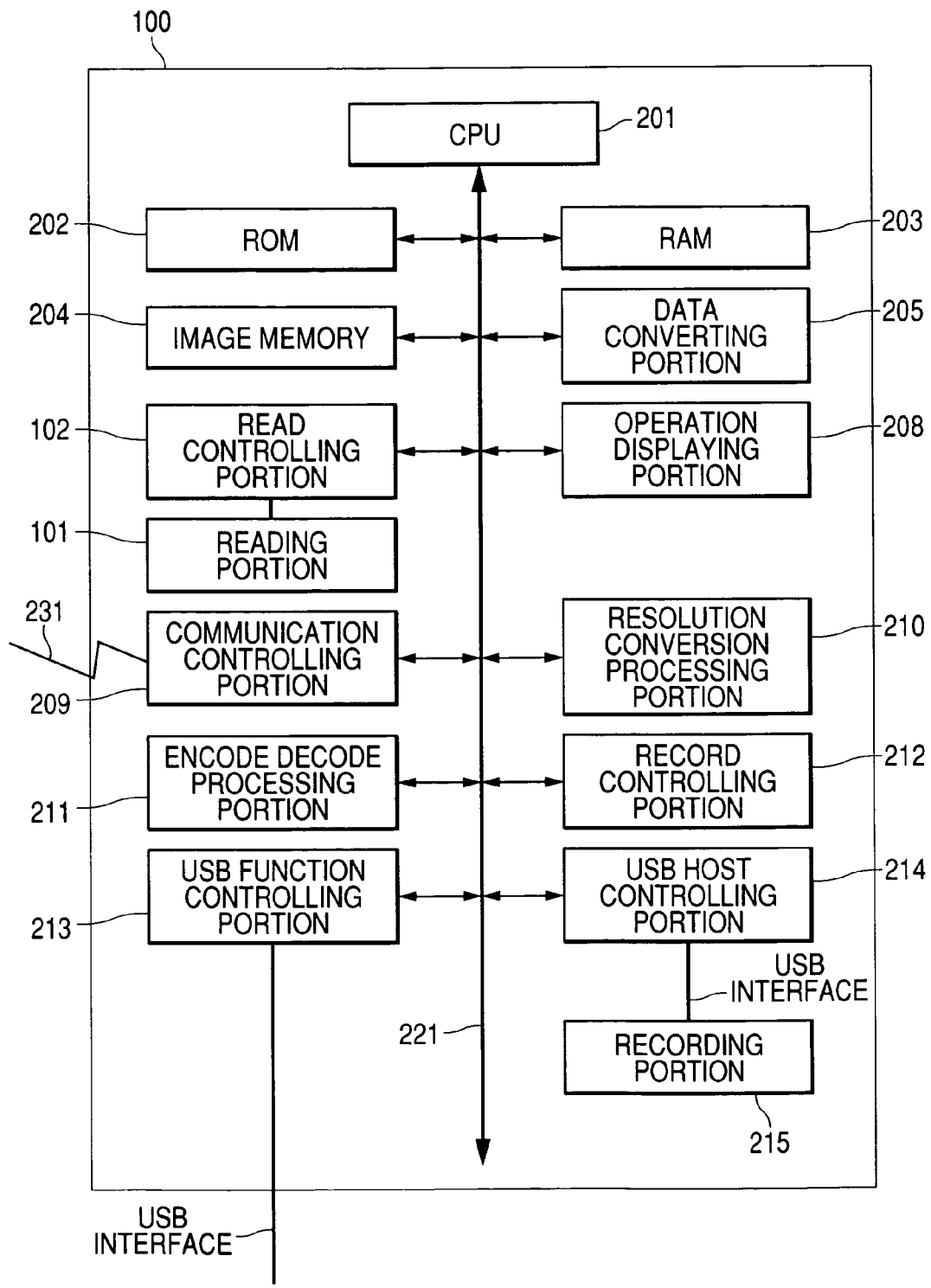
FIG. 1 is a block diagram showing a schematic structure of an image processing apparatus 100 according to an embodiment of the present invention.

FIG. 1 is a block diagram showing a schematic structure of an image processing apparatus 100 according to the embodiment of the present invention.

The image processing apparatus 100 includes a reading portion 101, a read controlling portion 102, a CPU 201, a ROM 202, a RAM 203, an image memory 204, a data converting portion 205, an operation displaying portion 208, a communication controlling portion 209, a resolution conversion processing portion 210, an encode/decode processing portion 211, a record controlling portion 212, a USB function controlling portion 213, a USB host controlling portion 214, and a recording portion 215.

The reading portion 101 optically reads an original using a photoelectric conversion element such as a CCD sensor or a CMOS sensor and converts optical information into electrical image data (image signal). The read controlling portion 102 performs various kinds of image processing including binary processing and halftone processing on the converted image data through an image processing control portion (not shown) to output high resolution image data. Here, the reading portion 101 may be any one of: a reduction optical system for forming an original image on the photoelectric conversion element at a reduced size through a plurality of mirrors and a plurality of lenses; and a contact image sensor having an equal-size optical system for forming the original image on the photoelectric conversion element at an equal size.

In this embodiment, the read controlling portion 102 is provided for both a sheet read controlling method for performing reading while the original is conveyed and a book read controlling method for scanning the original placed on an original table.

The CPU 201 is composed of a system controlling portion and controls the entire image processing apparatus 100. The ROM 202 stores control programs, a built-in operating system (OS) program, or the like, which are executed by the CPU 201. In this embodiment, the respective control programs stored in the ROM 202 are used for software control such as scheduling or task switching under the management of the built-in OS program stored in the ROM 202.

The RAM 203 is composed of a static RAM (SRAM) or the like and stores program control variables and the like. The RAM 203 also stores set values registered by an operator, management data for the image processing apparatus 100, or the like. Various work buffer regions are provided in the RAM 203. The image memory 204 is composed of a dynamic RAM (DRAM) or the like and stores the image data.

The data converting portion 205 performs the conversion of the image data, such as the analysis of a page description language (PDL) or the computer graphics (CG) development of character data.

The operation displaying portion 208 includes an operating portion and a displaying portion. The operating portion is composed of a numerical value input key, a character input key, a one-touch telephone number key, a mode setting key, a decision key, a cancel key, and the like. The operating portion is used for performing the decision of image transmission destination data and the registration of set data by a user. The displaying portion is composed of various keys, a light emitting diode (LED), a liquid crystal display (LCD), and the like. The displaying portion displays the states of various input operations performed by an operator, the operating state of the image processing apparatus 100, the status, and the like.

The communication controlling portion 209 includes a modulator-demodulator (MODEM) device and a network control unit (NCU). In this embodiment, the communication controlling portion 209 is connected with an analog communication line (such as PSTN) 231 and performs communication control in T30 protocol and line control such as a call in or a call out to the communication line.

The resolution conversion processing portion 210 performs resolution conversion control such as milli-inch resolution conversion on the image data. In the resolution conversion processing portion 210, it is also possible to perform scaling processing on the image data. The encode/decode processing portion 211 performs encode/decode processing and scaling processing on the image data (MH, MR, MMR, JBIG, JPEG, or the like) used in the image processing apparatus 100.

The record controlling portion 212 performs various kinds of image processing such as smoothing processing, record density correction processing, and color correction on the image data to be printed through the image processing control portion (not shown). Therefore, the image data is converted into high resolution image data and outputted to the USB host controlling portion 214 (described later). The record controlling portion 212 obtains status information data recorded in the recording portion 215 at regular intervals by controlling the USB host controlling portion 214.

The USB function controlling portion 213 performs the communication control for a USB interface. In the USB function controlling portion 213, the protocol control is performed based on the USB communication standards, data from a USB control task executed by the CPU 201 is converted into a USB packet, and the USB packet is communicated to an external information processing terminal. In addition, a USB packet from the external information processing terminal is converted into data and the data is transmitted to the CPU 201.

The USB host controlling portion 214 is a controlling portion for performing communication in the protocol specified in the USB communication standards. The USB communication standards are standards in which bidirectional data communication can be performed at high speed. Therefore, a plurality of hubs or a plurality of functions (slaves) can be connected with a single host (master). The USB host controlling portion 214 has a host function in the USB communication.

The recording portion 215 is a printing device such as a laser beam printer or an ink-jet printer and prints color image data or monochrome image data onto printing member. The recording portion 215 performs communication with the USB host controlling portion 214 in the protocol specified in the USB communication standards. In particular, the recording portion 215 has a functional capability. In this embodiment, a one-to-one connection mode is used for the USB communication in recording capability.

Figure 2:
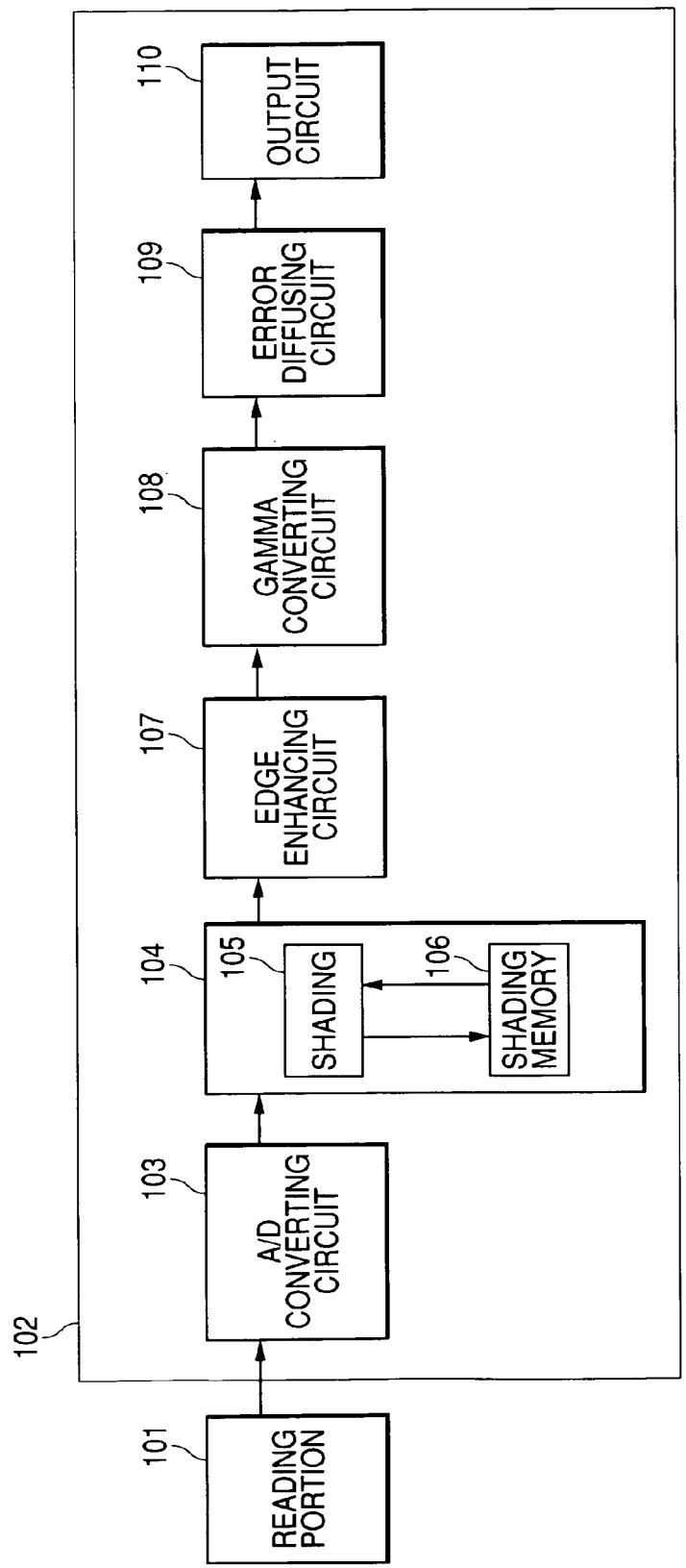
FIG. 2 is a block diagram showing a specific example of a read controlling portion 102 composing the image processing apparatus 100.

FIG. 2 is a block diagram showing a specific example of the read controlling portion 102 composing the image processing apparatus 100.

The read controlling portion 102 includes an A/D converting circuit 103, a shading correcting circuit 104 composed of a shading block 105 and a shading memory 106, an edge enhancing circuit 107, a gamma converting circuit 108, an error diffusing circuit 109, and an output circuit 110.

Next, the operation in this embodiment will be described.

First, the original is optically read by the photoelectric conversion element such as the CCD sensor or the contact sensor, of the reading portion 101. Analog data obtained from the photoelectric conversion element such as the CCD sensor or the contact sensor is inputted to the read controlling portion 102. In the read controlling portion 102, the analog data is converted into 16-bit digital data by the A/D converting circuit 103. The converted 16-bit digital data is inputted to the shading correcting circuit 104.

In the shading correcting circuit 104, light output data and dark output data from the reading portion 101 are stored in the shading memory 106 for each pixel. When the original is read, the stored light output data and dark output data are read from the shading memory 106 for each pixel corresponding to input data of the original and subjected to shading correcting calculation by the shading block 105. Shading-corrected image data is subjected to image processing by the edge enhancing circuit 107, the gamma converting circuit 108, and the error diffusing circuit 109, which are provided in the subsequent stage of the shading block 105. Then, DMA transfer from the read controlling portion 102 to a read buffer (not shown) allocated in the image memory 204 is performed by the CPU 201.

Next, the shading correcting calculation in this embodiment will be described.

The shading correction is processing for correcting a variation in level of the signal outputted from the CCD sensor (output characteristic of the CCD sensor) at the time when a reference image having a uniform density is read by the reading portion 101. Note that the variation in level is caused due to a variation in sensitivity of the CCD sensor included in the reading portion 101 for each pixel, an intensity distribution of an illumination system, a variation in imaging optical system, or the like.

First, the operation in the case where white shading data (light output data) is obtained will be described.

Figure 3:
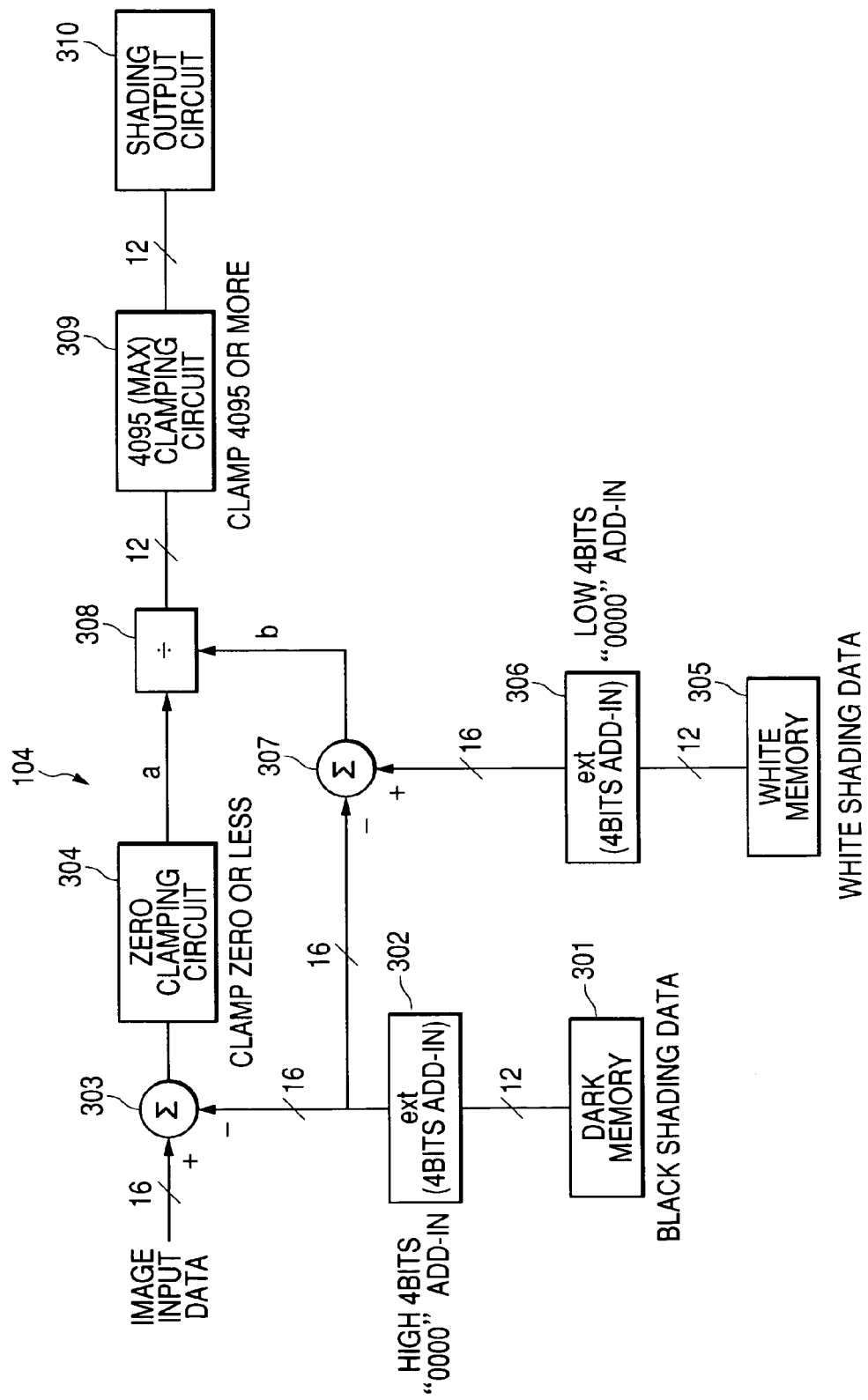
FIG. 3 is a block diagram showing a specific example of a shading correcting circuit 104.

FIG. 3 is a block diagram showing a specific example of the shading correcting circuit 104.

The shading correcting circuit 104 includes a dark memory 301, a bit add-in circuit 302, an adder-subtracter 303, a zero clamping circuit 304, a white memory 305, a bit add-in circuit 306, an adder-subtracter 307, a divider 308, a clamping circuit 309, and a shading output circuit 310.

When the white shading data is obtained, the reading portion 101 is moved to a position of a white reference plate (not shown). Then, a lamp of a light source (not shown) is turned on and data (white reference plate) is read by the sensor provided in the reading portion 101.

Figure 4:
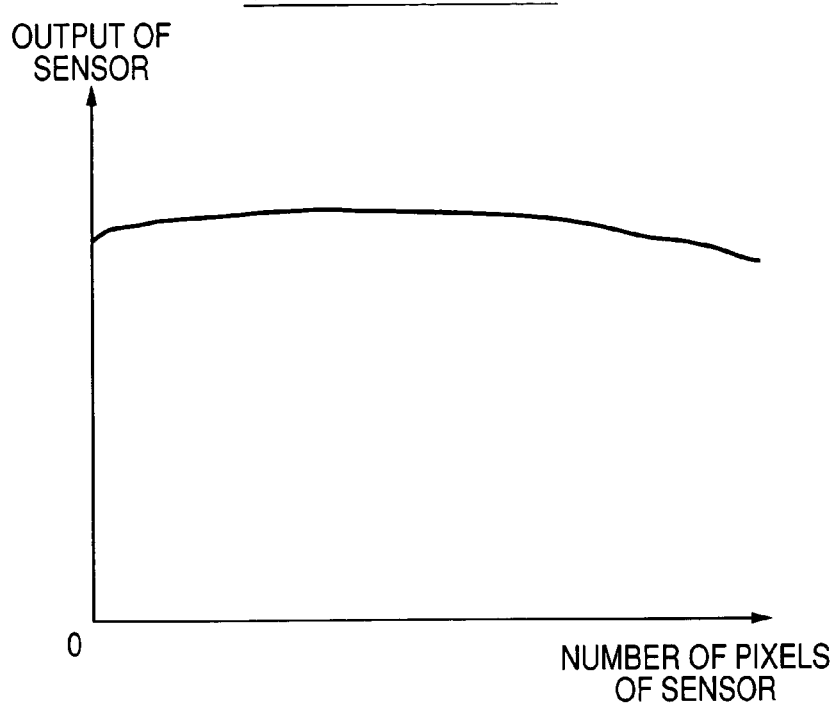
FIG. 4 shows a waveform example of white shading data in the embodiment.

FIG. 4 shows an example waveform of the white shading data in this embodiment.

In other words, FIG. 4 shows an example waveform of the data read by the sensor in the case where the white shading data is obtained and then the reading portion 101 is moved to the position of the white reference plate (not shown) and the lamp of the light source (not shown) is turned on.

As shown in FIG. 4, when the white shading data is obtained, the level of the output voltage of the sensor is high, so that it is a level that low four bits of 16-bit digital data acquired by the A/D converting circuit 103 can be substantially neglected. Therefore, when the white shading data is obtained, only high 12-bit data of 16-bit digital data which is acquired by the A/D converting circuit 103 and outputted therefrom is enabled. Only the enabled 12-bit data is stored in the shading memory 106 for each pixel unit of the sensor.

As described above, when the white shading data is obtained, only the high 12-bit data of the 16-bit digital data which is acquired by the A/D converting circuit 103 and outputted therefrom is stored in the shading memory 106. Thus, the memory capacity of the shading memory 106 can be reduced.

Next, when black shading data is obtained, data is obtained by the sensor at the same reading position as in the case where the white shading data is obtained with the lamp of the light source (not shown) turned off.

Figure 5:
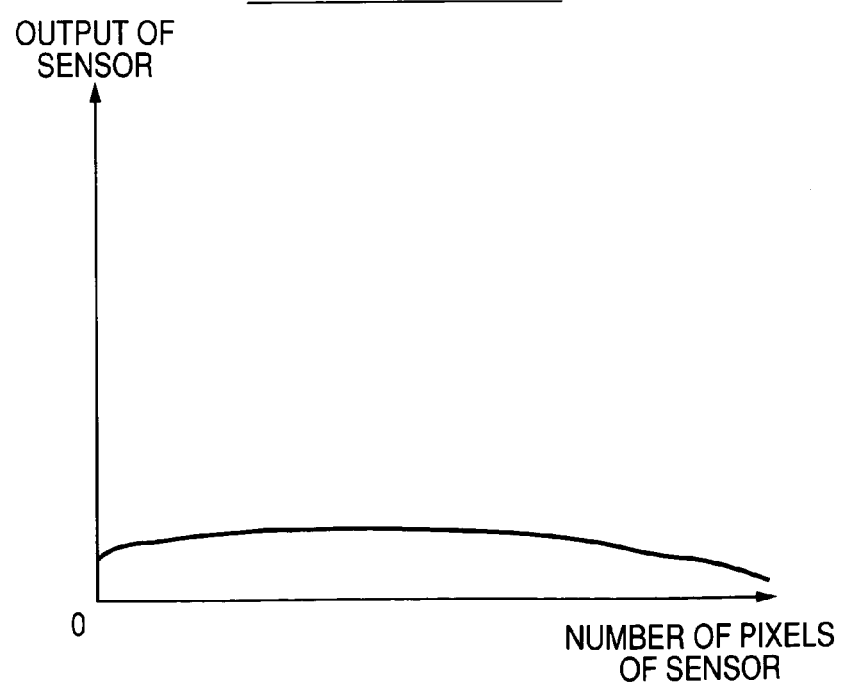
FIG. 5 shows a waveform example of black shading data in the embodiment.
Figure 6:
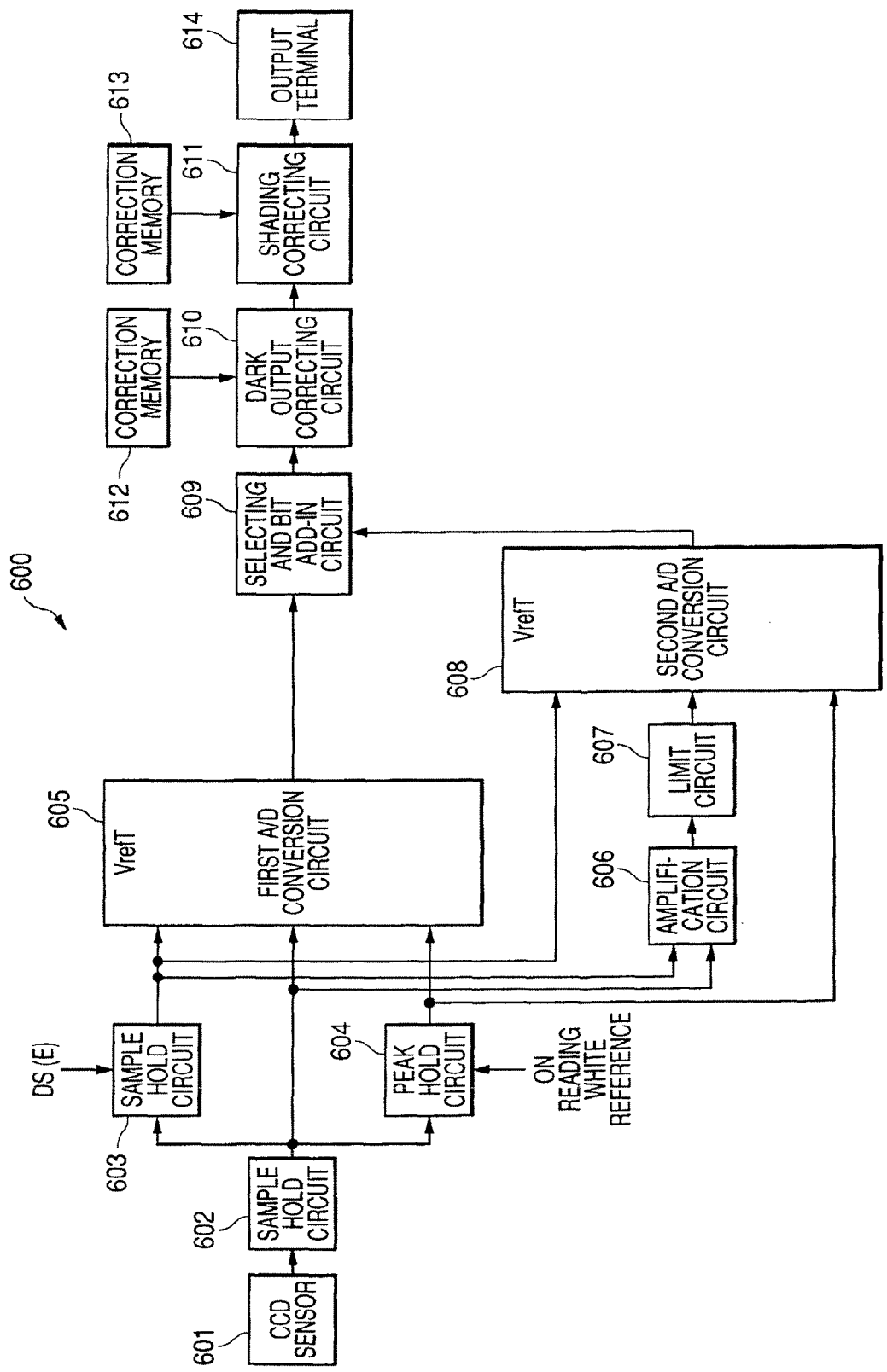
FIG. 6 is a block diagram showing a conventional image processing apparatus 600.
Figure 7:
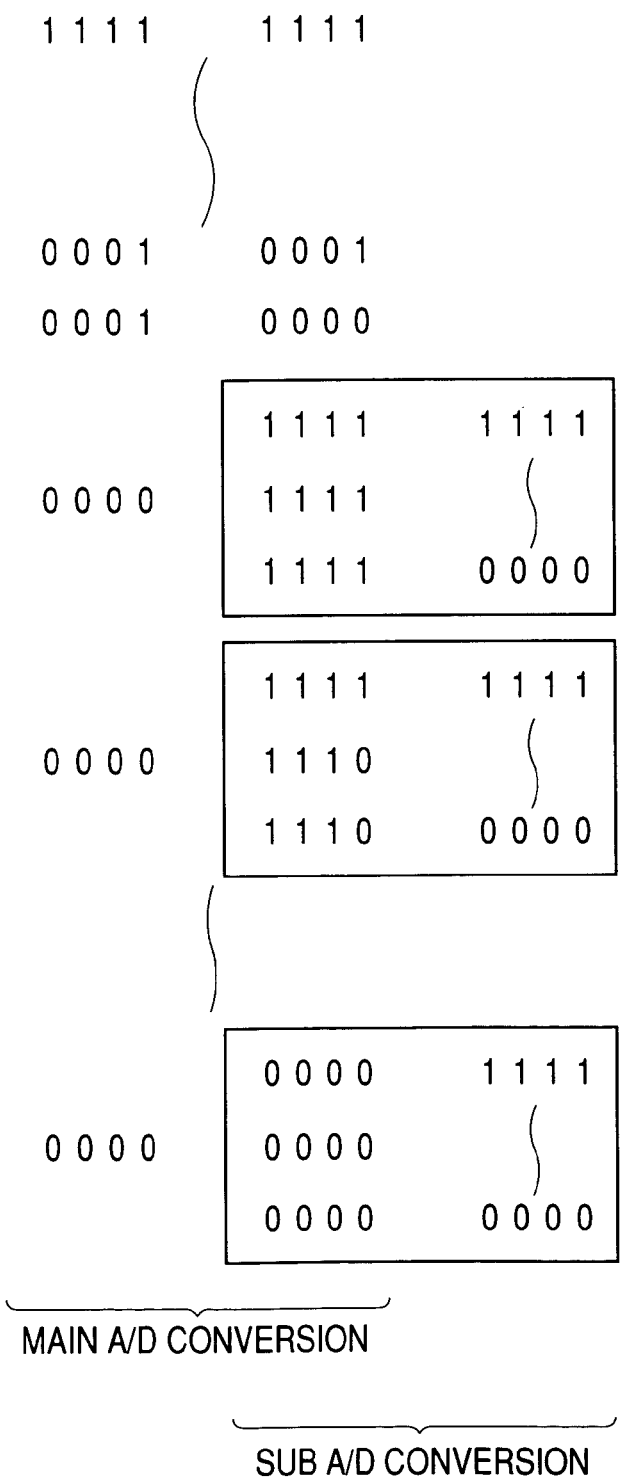
FIG. 7 shows a state of conversion processing in the conventional image processing apparatus 600.

FIG. 5 shows an example waveform of the black shading data in this embodiment.

In other words, FIG. 5 shows an example waveform of the data obtained by the sensor at the same reading position as in the case where the white shading data is obtained with the lamp of the light source (not shown) turned off at the time when the black shading data is obtained.

As shown in FIG. 5, when the black shading data is obtained, the level of the output voltage of the sensor is low and the output of the sensor is set, so that high four bits of 16-bit digital data acquired by the A/D converting circuit 103 becomes "0000". Therefore, only low 12-bit data is stored in the shading memory 106 for each pixel unit of the sensor.

As described above, when the black shading data is obtained, only the low 12-bit data of the 16-bit digital data which is acquired by the A/D converting circuit 103 and outputted therefrom is stored in the shading memory 106. Thus, the memory capacity of the shading memory 106 can be reduced.

That is, a 12-bit unit of the 16-bit digital data which is acquired by converting the white shading data and the black shading data, which are outputted from the sensor for each pixel by the A/D converting circuit 103 and outputted therefrom is stored in the shading memory 106.

Next, the shading calculation that is performed when the original is read in this embodiment will be described.

First, image input data read by the sensor is converted into the 16-bit digital data by the A/D converting circuit 103. The 16-bit image input data is subjected to the following calculation by the shading correcting circuit 104.

12-bit black shading data is read from the dark memory 301 in the shading memory 106. Four bits "0000" are added as high four bits to the read 12-bit black shading data by the bit add-in circuit (ext (4-bit add-in)) 302 to obtain 16-bit black shading data. A difference "a" between the 16-bit black shading data and the image input data is acquired by the adder-subtracter 303.

Here, when data indicating the difference "a" is zero or less (image input data<black shading data), the data is clamped to zero by the zero clamping circuit 304.

Then, 12-bit white shading data is read from the white memory 305 in the shading memory 106. Four bits "0000" are added as low four bits to the read 12-bit white shading data by the bit add-in circuit (ext (4-bit add-in)) 306 to obtain 16-bit white shading data.

Then, a difference "b" between the 16-bit white shading data and the 16-bit black shading data is acquired by the adder-subtracter 307. After the acquisition of the differences "a" and "b", the division is performed between the difference "a" between the image input data and the black shading data and the difference "b" between the white shading data and the black shading data by the divider 308 for 12-bit shading calculation.

In this embodiment, a shading calculation result is obtained based on 12 bits. Therefore, when the calculation result exceeds 4095 (value corresponding to a value that each of 12 bits is "1"), the calculation result is clamped to 4095 (each of 12 bits is "1") by the clamping circuit 309.

The number of bits in the shading calculation may be determined according to processing in the subsequent stage of the shading correcting circuit 104. When the processing in the subsequent stage requires 8 bits, 8-bit division is performed. Therefore, the amount of black shading data can be reduced without deteriorating the originally required precision of the black shading data.

Thus, the bit precision of the quantifying resolution on the black side can be improved.

With respect to the black shading data and the white shading data, the originally required 16-bit data is reduced to 12 bits, with the result that the capacity of the shading memory 106 can be reduced to ¾ and a circuit scale can be reduced.

Thus, when the above-mentioned series of processings are executed, the precision of the quantifying resolution on the black side can be increased, so that it is possible to perform the high gradation image reading according to the visual characteristic of the naked eye.

In other words, this embodiment is an example of an image processing apparatus for obtaining image information by outputting, as an image signal, an electrical signal corresponding to a reflectance or transmittance of an original from a photoelectric conversion element. The image processing apparatus includes an A/D converting circuit for converting an analog signal outputted from the photoelectric conversion element into an n-bit digital signal and a shading correcting circuit for correcting an output characteristic of the photoelectric conversion element. In the shading correcting circuit, when white shading data is obtained, high m bits of the n-bit digital signal are set as effective bits. When black shading data is obtained, low m bits of the n-bit digital signal are set as effective bits. Bits are added as low bits to the white shading data of the m-bits and bits are added as high bits to the black shading data. Then, shading calculation is performed.

In the shading correcting circuit, when the white shading data is obtained, the high m bits of the n-bit digital signal are set as effective bits. When the black shading data is obtained, the low m bits of the n-bit digital signal are set as effective bits. Then, (n-m) bits are added as low bits to the m-bit white shading data and (n-m) bits are added as high bits to the black shading data.

While the invention has been described with reference to the structure disclosed herein, it is not confined to the details set forth and this application is intended to cover such modifications or changes as may come within the purposes of the improvements or the scope of the following claims.

This application claims priority from Japanese Patent Application No. 2003-339997 filed Sep. 30, 2003, which is hereby incorporated by reference herein.

What is claimed is:

1. An image processing apparatus for obtaining image information by a photoelectric conversion element which outputs, as an image signal, an electrical signal corresponding to a reflectance or transmittance of an original, said image processing apparatus comprising:

an A/D converting circuit for converting an analog signal outputted from the photoelectric conversion element into an n-bit digital signal;

a white memory and a dark memory which store, respectively, a high m bits and a low m bits of the n-bit digital signal outputted from said A/D converting circuit in accordance with the photoelectric conversion element;

control means for processing the n-bit digital signal outputted from said A/D converting circuit to store the high m bits of the n-bit digital signal as effective bits in said white memory when white shading data is obtained, and to store the low m bits of the n-bit digital signal as effective bits in said dark memory when black shading data is obtained; and a shading correcting portion for correcting an output characteristic of the photoelectric conversion element, by performing a shading calculation based on the white shading data from said white memory and the black shading data read from said dark memory, said shading correcting portion adding (n-m) bits as low bits to the m-bit white shading data read from said white memory into an n-bit white shading data, and adding (n-m) bits as high bits to the black shading data read from said dark memory into an n-bit black shading data, and said shading calculation being performed by a linear operation in which a division is performed between the image signal from which is subtracted the n-bit black shading data, and the n-bit white shading data from which is subtracted the n-bit black shading data.

2. An image processing apparatus according to claim 1, wherein output of the division is data of the m bits.

* * * * *